(No Model.)

J. M. EGNOR.

STOVE PIPE AND CHIMNEY ATTACHMENT.

No. 287,258. Patented Oct. 23, 1883.

WITNESSES:

INVENTOR:

BY

ATTORNEYS.

UNITED STATES PATENT OFFICE.

JAMES M. EGNOR, OF CATSKILL, NEW YORK.

STOVE-PIPE AND CHIMNEY ATTACHMENT.

SPECIFICATION forming part of Letters Patent No. 287,258, dated October 23, 1883.

Application filed May 17, 1883. (No model.)

*To all whom it may concern:*

Be it known that I, JAMES M. EGNOR, of Catskill, in the county of Greene and State of New York, have invented a new and Improved Smoke-Pipe or Chimney Attachment, of which the following is a full, clear, and exact description.

The object of the invention is to form an upwardly-tapering jet-tube, which guides the products of combustion to the center of the pipe and prevents the air through which said products are ascending from forming a downward cold current to the fire, thereby preventing what is known as a "smoking pipe or chimney," and making a more uniform and thorough burning of the fuel.

Reference is to be had to the accompanying drawings, forming part of this specification, in which similar letters of reference indicate corresponding parts in both the figures.

Figure 1:
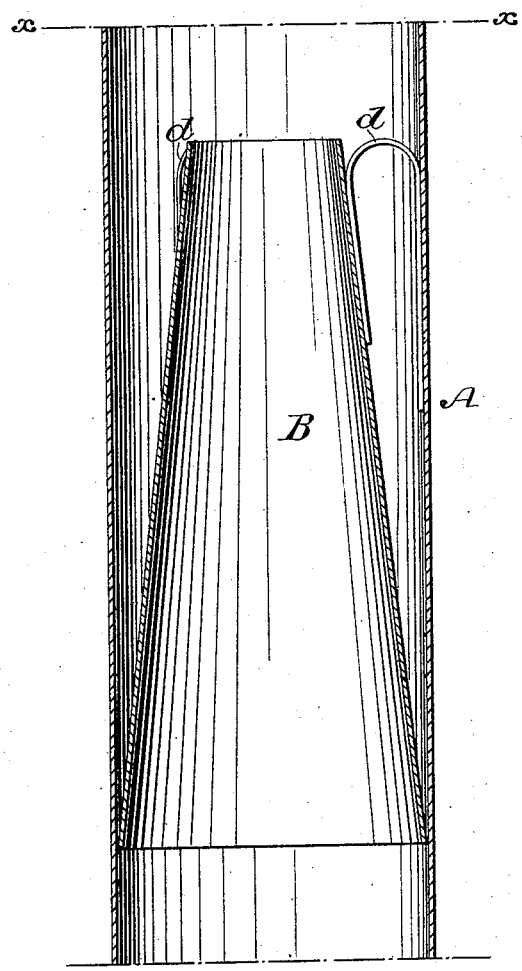
Figure 2:
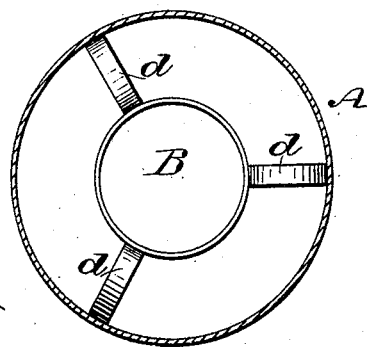

Figure 1 is a sectional elevation of a stove-pipe, showing my invention applied thereto; and Fig. 2 is a sectional plan view of the same, taken on the line $x\ x$ of Fig. 1.

A represents the stove-pipe, and B represents the draft-jet. The jet is made, by preference, of sheet metal, is hollow, and made in the form of a truncated cone. It is placed in the stove-pipe with its larger or base end downward or toward the stove, and this base end is made of a size to snugly fit the interior of the pipe. The upper smaller end of the jet is held in place in the center of the pipe by the curved springs $d\ d$, that are secured to the jet, and these springs also serve, by impinging against the inner walls of the pipe, to hold the jet securely in place in the pipe.

By tapering the tube B decreasingly from the bottom to the top a small aperture is formed in said top, and by fitting its lower end closely in contact with the pipe I am enabled to condense the volume of rising gases, so as to fill this comparatively small outlet, and thus prevent the down current of cold air, which hugs the wall or side of the pipe or chimney, from entering the tube B, and consequently the combustion chamber or space above the fire. In this way I avoid entirely what is known as a "smoking pipe or chimney."

Having thus described my invention, I claim as new and desire to secure by Letters Patent—

The combination of the pipe A, the springs $d$, and the conical pipe B, as and for the purpose described.

JAMES M. EGNOR.

Witnesses:
CHARLES EGNOR,
CHARLES FANNING.